US006950943B1

(12) United States Patent
Bacha et al.

(10) Patent No.: US 6,950,943 B1
(45) Date of Patent: Sep. 27, 2005

(54) SYSTEM FOR ELECTRONIC REPOSITORY OF DATA ENFORCING ACCESS CONTROL ON DATA SEARCH AND RETRIEVAL

(75) Inventors: Hamid Bacha, Great Falls, VA (US); Robert Bruce Carroll, Mount Kisco, NY (US); Lev Mirlas, Thornhill (CA); Sung Wei Tchao, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/459,240

(22) Filed: Dec. 10, 1999

(30) Foreign Application Priority Data

Dec. 23, 1998 (CA) .................................... 2256936

(51) Int. Cl.[7] ............................. H04L 9/00; H04L 9/32
(52) U.S. Cl. ...................... 713/200; 713/164; 713/165; 713/166; 713/201
(58) Field of Search .............................. 713/164, 165, 713/166, 200, 201, 202

(56) References Cited

U.S. PATENT DOCUMENTS

| 5,414,844 | A | * | 5/1995 | Wang .......................... 713/200 |
| 5,483,596 | A | * | 1/1996 | Rosenow et al. ............ 713/167 |
| 5,787,428 | A | * | 7/1998 | Hart .............................. 707/9 |
| 6,105,131 | A | * | 8/2000 | Carroll ........................ 713/155 |

(Continued)

FOREIGN PATENT DOCUMENTS

| JP | 04-280317 | 10/1992 |
| JP | 07-234843 | 9/1995 |
| JP | 08-263441 | 10/1996 |
| JP | 10-124398 | 5/1998 |

OTHER PUBLICATIONS

Frisch, AEleen; Essential System Administration; Dec. 1995; O'Reilly; 2nd Edition; pp. 23-66, 143-272,585-633.*
Garfinkel et al; Practical Unix Security; 1994; O'Reilly & Associates, Inc.; pp. 255-273.*
Garfinkel et al.; Practical UNIX Security; Jun. 1994; O'Reilly & Associates, Inc.; pp. 57-85.*

Primary Examiner—Gilberto Barrón, Jr.
Assistant Examiner—Jung Woo Kim
(74) Attorney, Agent, or Firm—Louis Herzberg

(57) ABSTRACT

When an electronic document is made available for review by other entities, it is often convenient to store the document in a repository or database managed by a third party. A system is provided in which the originator of the document is able to ensure the integrity and security of its document filed with a third party repository without having to trust the administrator of the repository. Both the document originator and the repository administrator have vault environments which are secure extensions of their respective work spaces. The vault of the document originator encrypts a document that it receives from the originator, prior to forwarding it on to the vault of the repository. On receipt of the encrypted document, the repository's vault signs the encrypted document itself before storing the document in the electronic repository and returning to the originator's vault proof of deposit of the encrypted document. When a request is made to view the document, it is made from the vault of the requesting party (a secure extension of the requesting party's work space) to the repository's vault. The repository's vault retrieves a copy of the encrypted document which it forwards, along with the requestor's identity to the originator's vault. The originator's vault verifies that the requester is authorized to view the document from the access control list using an access control list identifying access ownership privileges for the document stored in the vault itself. If the requestor has access, the originator's vault decrypts the document and forwards the decrypted document directly to the requestor's vault. The requestor must provide proof of receipt of the decrypted document.

3 Claims, 9 Drawing Sheets

U.S. PATENT DOCUMENTS

| | | |
|---|---|---|
| 6,178,422 B1 * | 1/2001 | Tada et al. ..................... 707/9 |
| 6,253,193 B1 * | 6/2001 | Ginter et al. ................. 705/57 |
| 6,292,904 B1 * | 9/2001 | Broomhall et al. ............ 714/1 |
| 6,314,409 B2 * | 11/2001 | Schneck et al. .............. 705/54 |
| 6,839,843 B1 * | 1/2005 | Bacha et al. ................ 713/176 |

* cited by examiner

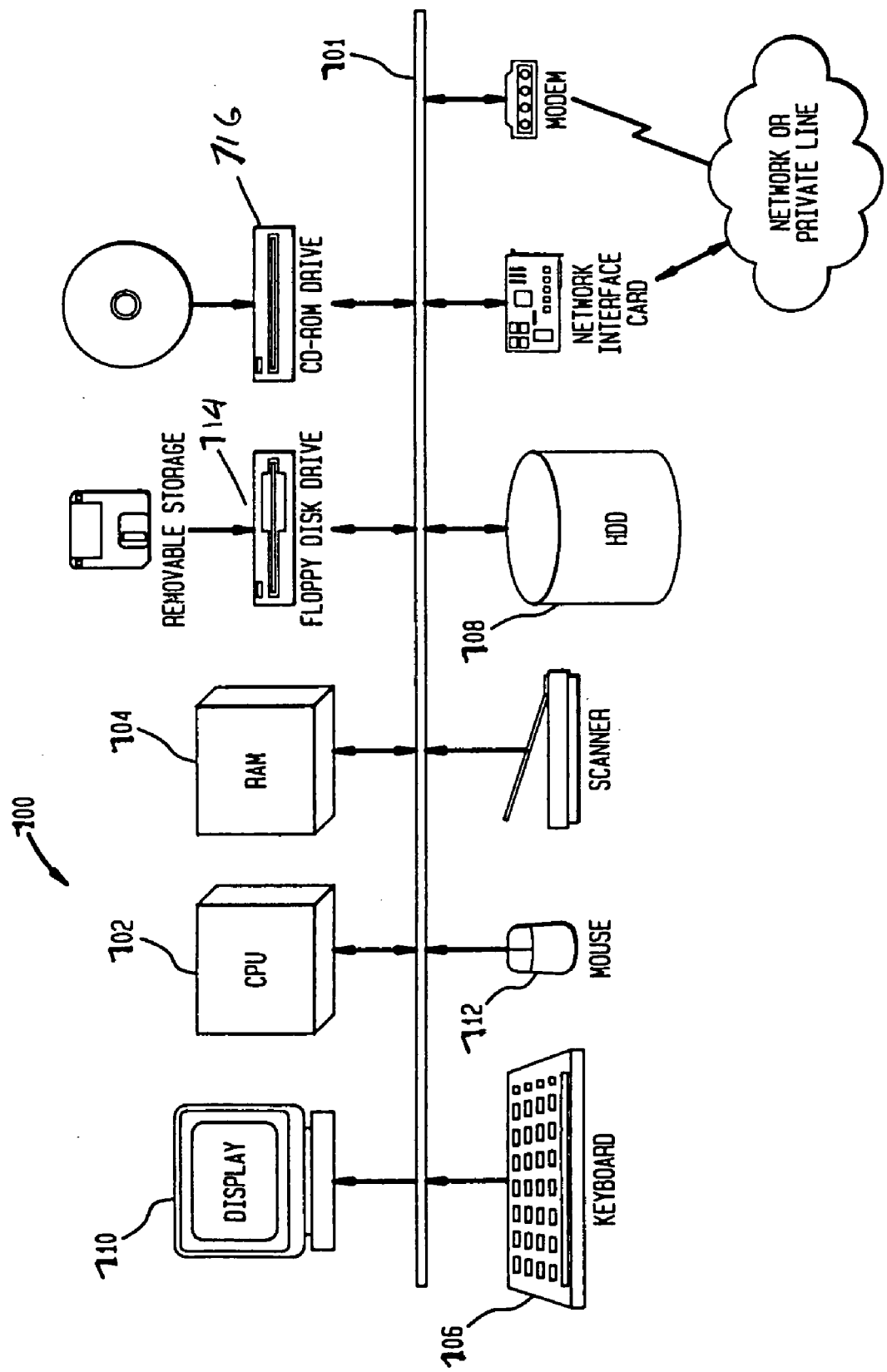

SYSTEM FOR ELECTRONIC REPOSITORY OF DATA ENFORCING ACCESS CONTROL ON DATA SEARCH AND RETRIEVAL

RELATED APPLICATION

Copending application Ser. No. 09/459,239 filed on even date herewith and entitled "System for electronic Repository of Data Enforcing Access Control on Data Retrieval" and incorporated herein by reference.

FIELD OF THE INVENTION

The present invention is directed to the field of electronic data storage, and provides, in particular, a secure data repository and exchange system administered by a third party data custodian in which access control is enforced on data search and retrieval.

BACKGROUND OF THE INVENTION

Recent parallel advances in network communications and public key infrastructure ("PKI") technology have prompted businesses and institutions to begin to utilize electronic documentation for record-keeping and transactions of all types. With improvements in transmission integrity and security, it can be confidently assumed that documents sent electronically over the Internet and other open networks will arrive intact and tamper-free. Database management systems coupled with modem computer memories capable of storing several gigabytes of data have made it practical for businesses and institutions to simply dispense with maintaining paper records whose bulk necessitates real estate costs.

Typically, data originating in one entity may have to be transmitted to others for any number of reasons such as deposit, review, etc. The data elements could be of the form of unstructured document files or structured records, such as bank account and other financial information. Using the example of unstructured data, it may be necessary to forward a document from the originating system to other computers in the same system or to computers residing on different systems for the purposes of review. This could occur equally in a business situation (e.g., a proposal for a joint venture or complex bid tender) as in an institutional setting (e.g., a graduate thesis to be reviewed by faculty advisers prior to submission to a university thesis review committee). The document has been created electronically since this will facilitate revisions and additions (particularly if it is lengthy) without having to retype the entire document each time.

Having the document in an electronic form also facilitates review of it because the document in this form is easily transmissible. Intended reviewers can discover that a document is available by searching the system once they are given access to the storage location of the document.

There are a number of reasons, such as security, data integrity and system or network availability, why the document creator will not want to store the review document locally if it meant giving access, behind its firewall, to third parties. These reasons are discussed in greater detail in our concurrently filed patent application titled "System for Electronic Repository of Data Enforcing Access Control on Data Retrieval" Ser. No. 09/459,239, which is commonly assigned and which application is incorporated herein by reference.

Our concurrently-filed application is directed to a system in which the integrity and access to data stored in a repository is maintained independently of any action of the third party administrator of the repository.

The invention described in that application is very efficient for systems with large numbers of documents accessible to large numbers of users because the information on authorized user access to the documents is stored in a single, central location, that is, in the repository itself. Users obtain secure knowledge of their access to documents by a means external to the system.

The present invention is a modification in which the system itself contains the information on authorized user access, which is also secure from any actions of the third party administrator of the repository.

SUMMARY OF THE INVENTION

Thus, it is an object of the present invention to provide an electronic document storage and exchange system in which the documents are physically stored in a repository administered by a third party, but in which users can search to determine to which documents in the repository they have access.

It is also an object of the invention to provide a system in which the integrity and access to the information about authorized user access to the data stored in the repository is available through the system, but is not dependent on the actions of the third party repository administrator.

Accordingly, in one aspect, the present invention provides a secure system for searching electronic data files stored in a data repository system. The system includes a communications environment that houses a first agent program for a depositor computer of an electronic data file in the data repository system and a second agent program for a first user computer with access privileges to the electronic data file. A manifest is accessible to and maintained by the first agent program. The first user computer has a record of its access privileges to the electronic data file which is accessible to and maintained by the second agent program. When changes are made to the manifest affecting the first user computer's access privileges to the electronic data file, these changes are communicated from the first agent program to the second agent program so that the first user computer's record of its access privileges can be updated. The first agent program is also able to verify the first user computer's access privileges to the electronic data file before the electronic data file is released to the second agent program.

According to another aspect, the invention provides a process for maintaining secure electronic data searching of an electronic data repository in a system having a manifest listing access controls for each electronic data file stored in the data repository and a record listing document access privileges for each computer with access to electronic data stored in the repository. The process consists of updating a manifest for an electronic data file stored in the repository, identifying all computers with a change in access to the electronic data file effected by the update, communicating the change in access to all affected computers, updating the access privileges records of all affected computers, and communicating the updated access privilege records to the affected computers.

In a further aspect, the invention provides a secure system for searching electronic data files stored in a data repository system that includes means for maintaining a manifest listing access controls for each electronic data file stored in the data repository system, means for restricting access to each manifest to a computer with deposit privileges, means for maintaining a record listing access privileges to the electronic data files associated with each computer with access privileges to at least one electronic data file in the data repository system, means for restricting access to each said record to the associated computer with access privileges, and means for updating the record associated with each computer affected by an access change in a manifest.

Media encoded with program code to effect the above-described system or processes is also provided in the invention.

BRIEF DESCRIPTION OF THE DRAWINGS

Embodiments of the invention will now be described in detail in association with the accompanying drawings, in which:

FIG. 7 is a block diagram of a computer system for use with the present invention.

DETAILED DESCRIPTION OF THE PREFERRED EMBODIMENTS

Figure 1:
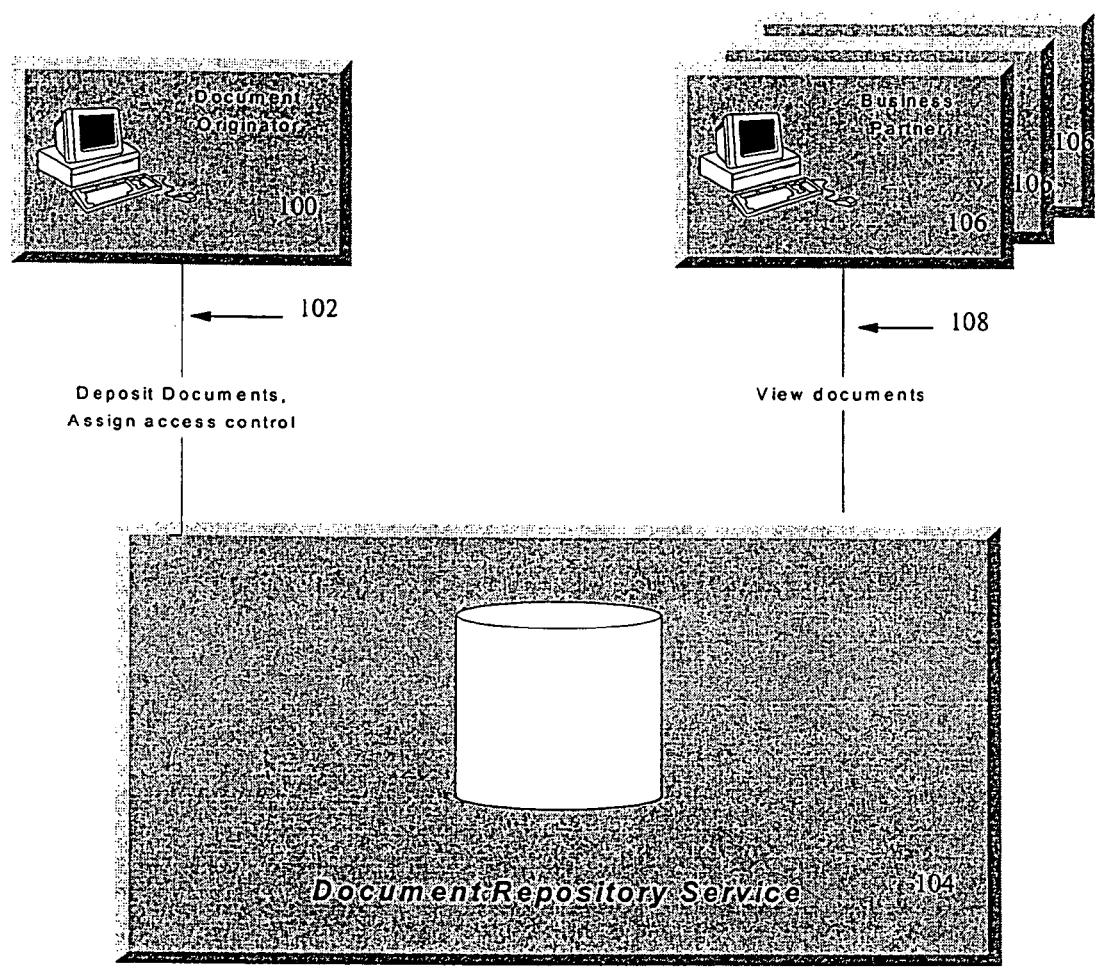
FIG. 1 is a schematic diagram of a document repository system utilizing a third party custodian.

A conventional arrangement for a document repository system utilizing a third party custodian is illustrated in FIG. 1. A document originator 100 can deposit documents via its connection 102 with a remote document repository service 104, such as a database, administered by a third party. As the owner of the deposited documents, the document originator 100 can assign access to the documents. For example, the document originator may assign a business partner 106 to have the "read" privilege, which means that the assigned business partner is allowed to retrieve the document via its connection 108 to the document repository service 104, but cannot make changes to the document on deposit.

In such conventional systems, the document deposited by the document originator 100 is normally not encrypted so that the business partner 106 will be able to review the document on demand. This is because there are problems associated with decrypting documents in the prior art. Document decryption requires access to the private key of the document originator 100. To give access to its private key, the document originator 100 must either make itself available online during all times that decryption might be requested in order to perform the decryption itself (the issue of system availability), or must set up a scheme in advance to make its private key available directly to the business partner 106 or through a trusted proxy (not shown).

U.S. Pat. No. 5,491,750 of International Business Machines Corporation is "Method and Apparatus for Three-Party Entity Authentication and Key Distribution Using Message Authentication Codes". This patent describes a system which allows for the distribution of secret session-management keys shared by two or more communication partners after the communication partners have been authenticated through a trusted intermediary. However, the keys generated under this scheme, and others like it, are short-lived and intended to be used as little as absolutely necessary. It is not clear that such a scheme would be appropriate to provide securely transmit decryption keys between communication partners in a document review system, with a persistent document repository.

Thus, in conventional systems where documents are deposited for a period of time and are not encrypted (FIG. 1), the third party administrator of the repository service 104 must be trusted with maintaining the integrity of the document.

The document repository system of the preferred embodiment of the present invention is built using the IBM Vault Registry product, the subject of U.S. patent application Ser. No. 980,022, titled "Secure Server and Method of Operation for a Distributed Information System", filed Nov. 26, 1997, assigned to IBM Corporation. U.S. patent application Ser. No. 980,022, is hereby incorporated herein by reference. The IBM Vault Registry product provides an enhanced web server environment that implements a secure extension, called a vault, of the client's environment. This system relies on the modern transmission technology described in the Background of the Invention, that electronic transmission of documents and other data will arrive intact and error free. Resources contained within a client's vault are available only when accessed from the client using strong authentication via certified public keys. Depending on the environment, access may be through the client's web browser.

The information content of the vault is encrypted for privacy. Each vault on a server has a unique encryption key and mechanisms inhibit access to the keys except through the trust path approved by the owner of the vault, such as through a browser. Programs that run within a vault are isolated by operating system services to ensure such programs:

a) operate in a process with a system identity (a virtual logon) so that the identity is available to dependent processes without the possibility of alteration by a program operating in the vault;

b) have access to the data content of the vault in which they are running—but to no other;

c) are approved for running in the vault by the owner of the vault; and d) are signed to prevent tampering and "Trojan horse" attacks.

Programs operating in a vault can deposit information in the same vault or other vaults having secure access to each other's public keys. Normally, these vaults will be located on the same vault server, but can be on different vault servers with access to a common Certificate Authority to provide the public key information. In the context of a vault repository, "deposit" can mean different things. In one implementation, deposit can refer to encrypting the data in the encryption key of the target vault and signing the data in the signature key of the depositing vault. Vault programs cannot directly access either encryption or signature keys. This is done through an API. Optionally, the "deposit" function can place information in a queue contained in the target vault. Another option provides a "return receipt" that ensures that the information was deposited and that a program in the target vault opened the data. All of these "deposit" functions provide a means to pass information among vaults in such a way that:
  a) their origin process cannot be denied;
  b) their content cannot be viewed by those with the ability to inspect inter-process communication buffers; and
  c) delivery is guaranteed.

If an application does not choose to queue data to the target vault, it can elect to store the information in a file, database or use any other system services that can treat the data as an "opaque" item (e.g., serializing it for object persistence). This opaque information can be managed by standard system techniques for the purpose of backup and recovery. However, its content can only be decrypted by a program running in the context of the vault that owns it using the SecureDepositor application programming interfaces.

Figure 2:
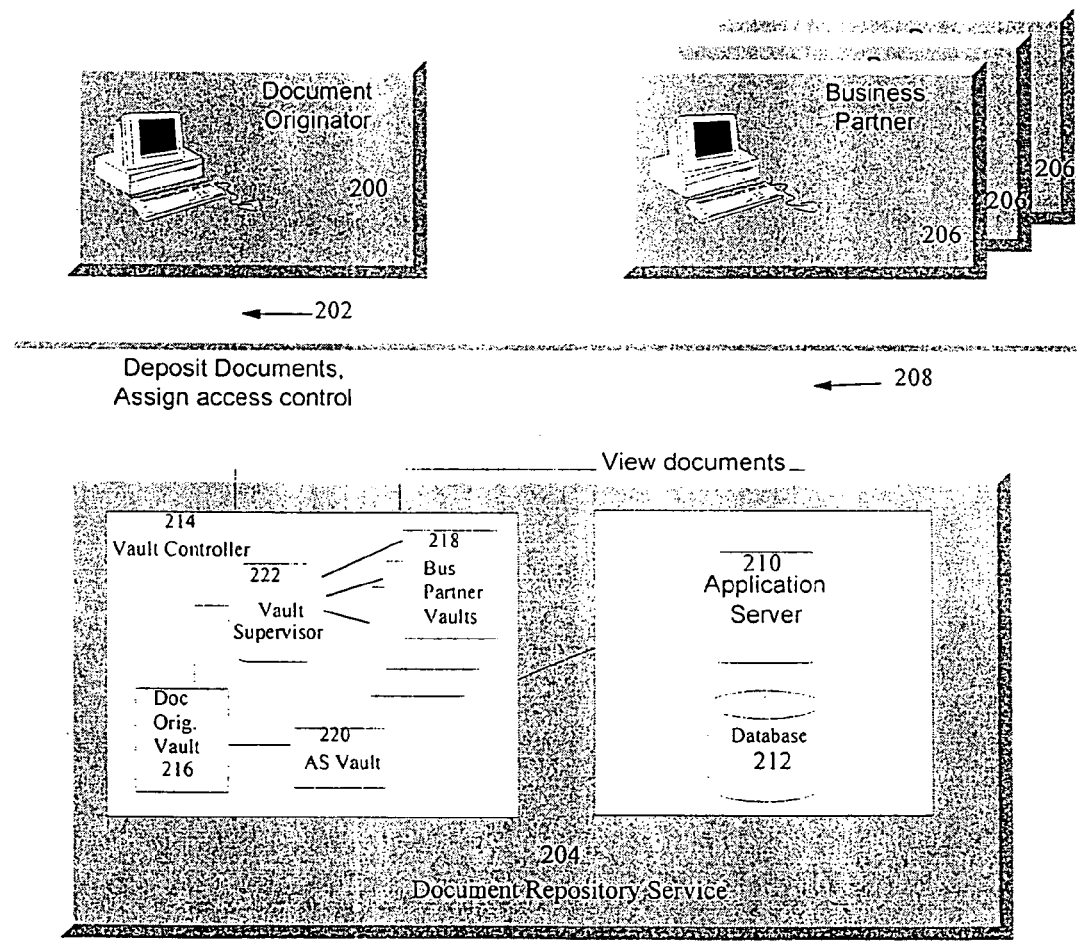
FIG. 2 is a schematic diagram, similar to FIG. 1, showing a vault document repository system utilized in the preferred embodiment of the present invention.

Using the IBM Vault Registry product, the preferred embodiment of the invention has been developed as illustrated schematically in FIG. 2.

As in the system of FIG. 1, in the scheme illustrated in FIG. 2, a document originator 200 can deposit documents via its connection 202 with a document repository service 204, and as the owner of the deposited documents, can assign levels of access to the documents to third parties 206, such as business partners, who gain access to the documents in the document repository service 204 via their own network connections 208. However, unlike the system described above, users of the document repository system are not obliged to trust the third party to maintain the integrity of documents filed in the repository.

The document repository system 204 of the preferred embodiment comprises two components, an application server 210 and a vault server 214. The application server (AS) is a program to administer the database repository 212, which may be on the same machine or may be remotely located on a closed network. The vault server 214 includes a number of components, user vaults 216, 218 which are assigned on an individual basis to document originators 200 and business partners 206, an AS vault 220 assigned to the application server 210, and a vault supervisor program 222.

A user vault 216 or 218 can be accessed only by the user (document originator 200 or business partner 206) to whom the vault has been assigned, upon proper authentication. The individual vaults do not have direct access to the document database 212, access is through the AS vault 220 and the application server 210.

The application server component 210 does not run on a trusted computing base, but can execute on any platform. The application server has a reciprocating component which runs in the AS vault 220 assigned to it in the vault server 214. The AS vault 220 can communicate with the application server 210, and through the application server, has access to the documents database 212.

Figure 3:
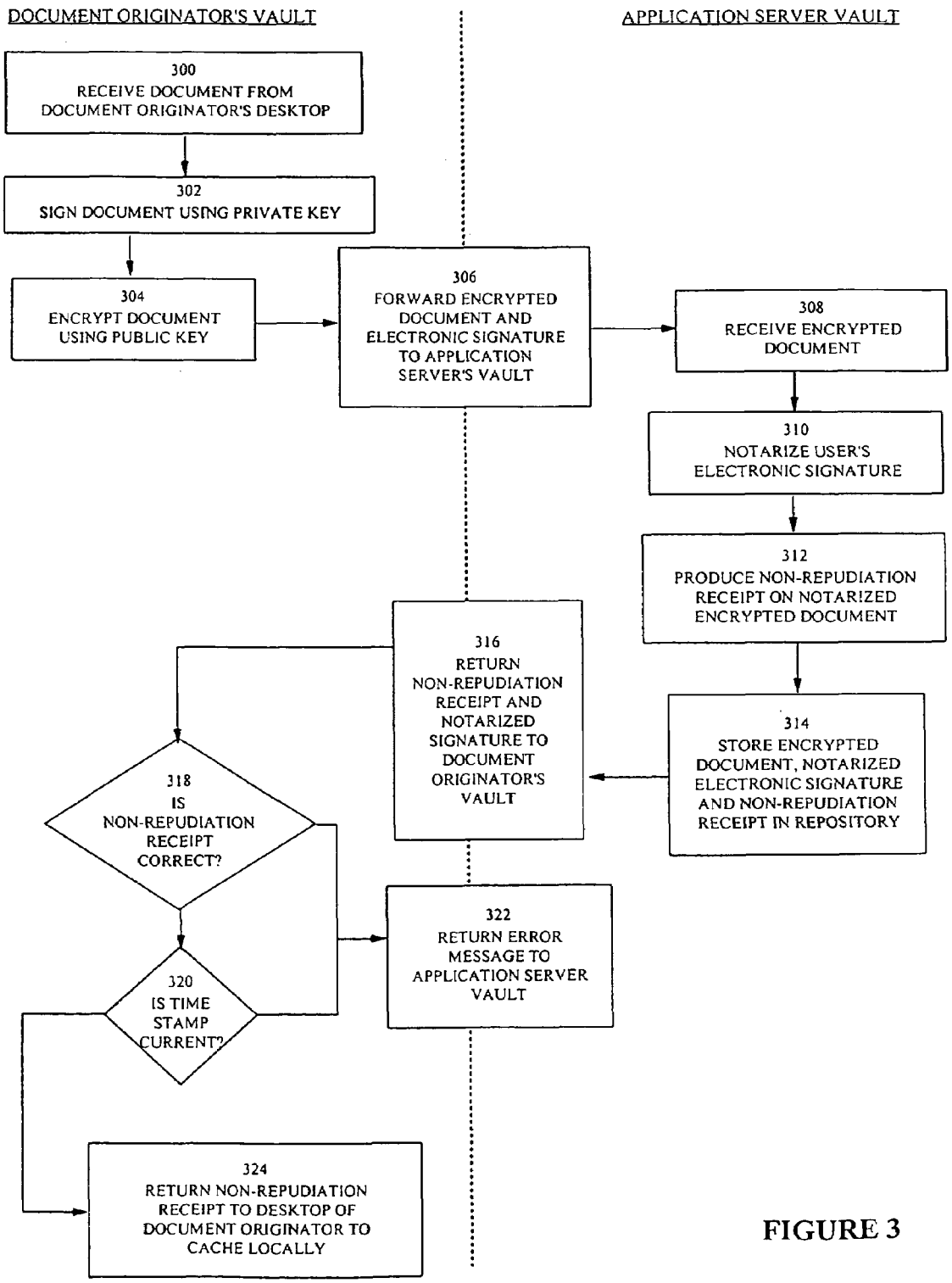
FIG. 3 is a flow diagram illustrating the process of document creation, according to the invention.

FIG. 3 is a flow diagram illustrating the process of document creation, according to the preferred embodiment of the invention. Using the IBM Vault Registry environment, a personal vault is notionally a secure extension of the vault owner's environment. Thus, the interaction between the process steps in FIG. 3 are shown between the vaults of the document originator and the application server.

When creating a document in the data repository, the document is first sent from the desktop of the user who created or originated it, to the user's (document originator's) personal vault (block 300), where the document is "signed" with the user vault's private signing key (block 302).

An electronic signature of a data element is a guarantee, provided by the signatory, of the integrity of that data element. A signature may be computed by first computing the data element's digest. The digest is a relatively small structure (e.g. 128 bits for MD2 or MD5 digest) with specific properties to guarantee security. First, it is a one-way function, which means that given a digest, it is impossible to obtain the original document that produced it. In additional, given a digest, it is impossible (or computationally infeasible) to find a second pre-image, which would have the same digest. The digest is also collision-resistant. This means that two different pre-images are highly unlikely to produce the same digest.

The data element's digest is then encrypted with the user vault application's private signing key (block 304). In the preferred embodiment, both symmetric and public-key asymmetric cryptography technology are utilized.

With public key cryptography, an application has two keys, a public key and a private key, referred to as a key pair. The private key is held locally by the application, and is discussed in further detail below. The public key is made available to all users, usually through a directory service, such as X.500 distributed directory. Public key distribution is well known in the art, and is not discussed in further detail in the present invention.

When public key cryptography is used, a data element encrypted with the public key may only be decrypted with the corresponding private key. Similarly, a data element encrypted with the private key may only be decrypted with the public key.

In symmetric key technology, a single key is used for both encryption and decryption. In current practice, encryption/decryption and key generation are much faster in symmetric key technology than with public-key asymmetric technology.

Data is normally encrypted using a randomly generated symmetric key. Then, the symmetric key is itself encrypted using the user's public encryption key, and is stored with the document so that is becomes part of the document.

Continuing with FIG. 3, the encrypted document and the electronic signature are forwarded to the application server's vault for filing in the document database (block 306). On receiving the encrypted document (block 308), the application running in the application server's vault notarizes the signature (block 310) by re-signing it with its own private signing key.

The notarization of a signature, in an electronic context, means that a third party, which acts as a "notary", certifies the content of a signature. (All of the duties attending the legal office of notary, as conferred by a government authority, are not intended to be covered by the references in this specification to "notary" and "notarization".) In general, electronic notarization of a signature is done as an extra precaution, in order to prevent unauthorized modification of the signature at a later time. In the case of the present invention, notarization of the user's digital signature prevents the user from modifying the original document in the document repository. A check of the notarized signature associated with the document would reveal any inconsistencies.

A notarized electronic signature contains two pieces of information, the originator's signature of the given data element and the notary's signature of the originator's signature. The notary's signature should be computed over the originator's signature and the current time stamp.

The application running in the application server's vault then signs the document it has received (block 312). Because the data it receives from the user is encrypted, the application server actually has no knowledge of the contents of the document. Therefore, according to the invention, this second signature is computed over the encrypted document, and the originator's notarized signature. The application server's signature constitutes a non-repudiation receipt, providing proof to the document originator (depositor) that the repository service received the document. The creation of the document in the repository may then not be denied later by the repository service.

The encrypted document, the document originator's notarized signature, and the non-repudiation receipt are all stored in the application server's repository or the application database (block 314). The non-repudiation receipt is sent to the vault of the document originator (block 316). the vault of the document originator checks the correctness of the non-repudiation receipt (block 318) by verifying the signature of the encrypted document. The document originator's vault also checks the currency of the time stamp in the notarized signature (block 320). The tolerance for the time stamp is application dependent. If either of these tests fail, an error message is returned to the AS vault (block 322) and logged in the system. If the receipt is correct and current, the application running the user's vault returns the non-repudiation receipt to the originating user (block 324) to be cached locally for future reference, in the event proof is required that the document has been stored in the repository.

It is possible that the document originator may sign and/or encrypt the document using his own proprietary technique, before submitting it to his vault for storage. However, the document repository is not sensitive to the content of the document being stored. Hence, an encrypted document will be re-signed and re-encrypted by the user's vault, as any other document would be handled.

Figure 4A:
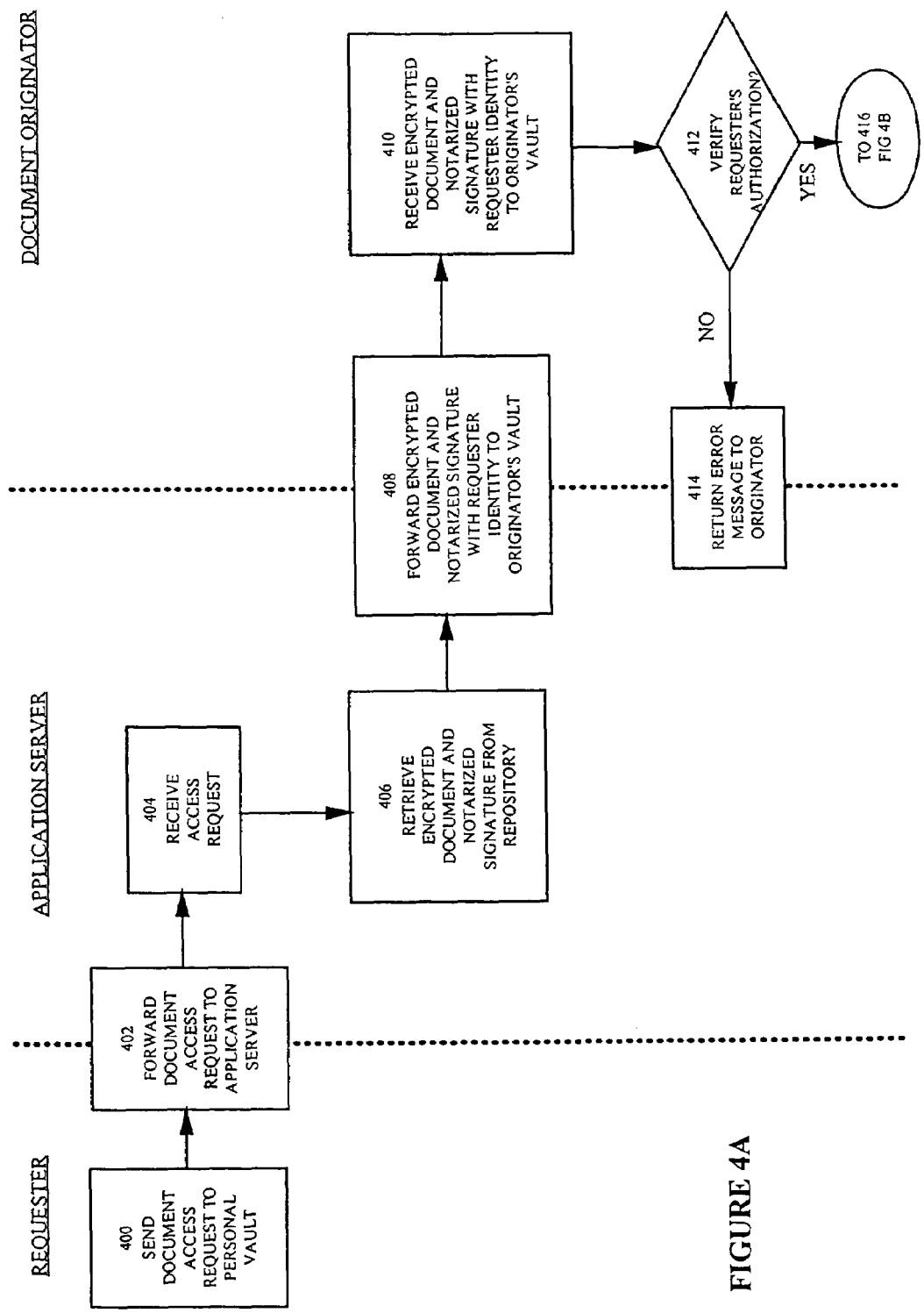
FIGS. 4A and 4B, contain a flow diagram illustrating the process of document retrieval according to the invention.
Figure 4B:
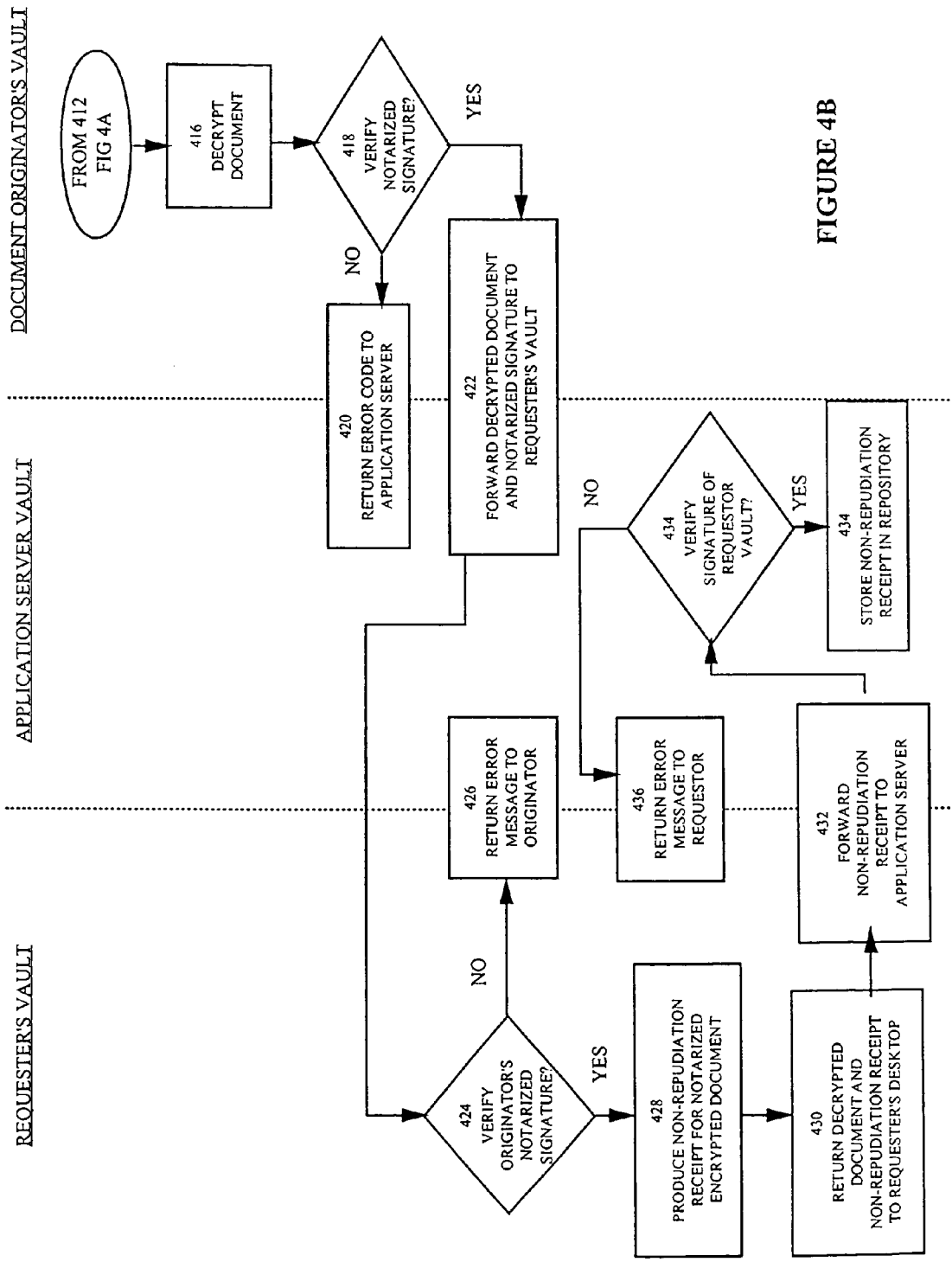

FIGS. 4A and 4B contain a flow diagram illustrating the steps, according to the preferred embodiment of the invention, which must take place to permit a document to be retrieved by a requester who has been authorized under a type of manifest maintained by the document originator for each document called an access control list (ACL). As in FIG. 3, the process steps have been divided between the three actors, user, application server and requester, on the basis that the personal vaults of each are notional secure extensions of their respective work spaces.

Beginning with FIG. 4A, the requestor makes a request to his vault application to retrieve a document from the application server repository (block 400), and the requestor's vault application, in turn, forwards the request for the document to the application server's vault (block 402).

The application server's vault application receives the access request (block 404) and retrieves the encrypted document and the originator's notarized signature from the application database (block 406).

The application server's vault application sends the encrypted document and the notarized signature to the vault of the document originator. The application server's vault also sends the identity of the requester's vault to the originator's vault (block 408).

The originator's vault checks that the requestor is authorized to retrieve the document (block 410). In the preferred embodiment, document access control is enabled through access control lists used to restrict document access only to authorized entities. An access control list (ACL) is associated with a document, and is stored and maintained in the document originator's vault as described below in association with FIGS. 5A and 6. The ACL must be checked when a requestor sends a request to retrieve a document. A requestor will only be given a copy of the document if it has authorized access.

According to the preferred embodiment of the invention, capability lists can be employed to enable requesters to verify their access to documents in advance of making access requests. A capability list identifies all documents in a repository to which a particular user has access privileges. A requester's capability list is stored and maintained in its own vault. The requester determines which documents it has access to simply by checking its list. The use and maintenance of capability lists are discussed in greater detail below in association with FIG. 5B.

If the requestor is not authorized to access the document, an error message is returned to the originator and is logged in the system (block 414).

Continuing with FIG. 4B, if the requestor is authorized to receive the document, the originator's vault application decrypts the document (block 416) and verifies the notarized signature (block 418). Since the originator's original signature was computed over the unencrypted document contents, only those users with access to the document contents (i.e., with the originator's private key) are able to verify the signature. If the signature does not correspond with what the document originator has in its own files, then it will be clear that it is not the same version of the document as deposited, and the originator will return an error message to the application server (block 420).

If the signature is verified, the originator forwards the decrypted document and the notarized signature to the requestor's vault (block 422).

On receipt of the decrypted document, the requestor's vault application attempts to verify the originator's notarized signature (block 424). If the requestor is unable to verify it, an error code is returned to the originator and is logged in the system (block 426).

If the originator's notarized signature can be verified, the requestor's vault signs the notarized signature that it received with the document. This signature is computed over the notarized signature, as well as the current time stamp, and constitutes a non-repudiation receipt (block 428) proving that the requestor retrieved the document from the repository. The requestor's vault returns the decrypted document along with the non-repudiation receipt it has generated to the requestor's desktop (block 430). The requestor's vault also forwards the non-repudiation receipt to the application server's vault (block 432). The application server verifies the signature of the requestor vault on the receipt (block 434). If the signature cannot be verified, an error message is returned to the originator and is logged in the system (block 436). If the signature can be verified, the application server vault stores the receipt in the application database (block 438) for later use if the application server must prove that the requestor did retrieve the document.

Immutability of Access Control for Document Retrieval

As discussed above, in a data repository, there is a requirement for document access control. This means that only those users authorized by the document's owner, are able to view the document, and that document access permissions may only be modified by the document's owner (i.e., the document originator) and those other users that have been authorized by the document's owner to modify the given document's access control list. It is important to have assurance that even the repository administrator does not have the power to modify a document's access permissions without authorization from the document's owner.

There are two different types of application requirements for the immutability of document access control. Document access must be checked:

1) when a user performs a search to find all documents that it is authorized to view; and
2) when a user performs an actual retrieval of a document.

All applications must enforce access control on document retrieval (access type 2 above). For this type of access, the repository must guarantee that the access control of a document cannot possibly be modified by an unauthorized user, such as a business competitor.

However, in some applications, it is not essential for a user to be able to query the document repository for all documents that it is authorized to see. For example, this knowledge may be communicated off-line through business meetings or over the phone. In that case, the user already knows what documents it has access to, and therefore the requestor's knowledge of its own document access cannot be affected by actions of the repository.

A system that enforces immutability of access control only on document retrieval, and not on document search, is the subject matter of our concurrently filed application titled "System for Electronic Repository of Data Enforcing Access Control on Data Retrieval" Ser. No. 09/459,239. In this system the access control information is stored in the database/repository of the application server.

A stronger form of access control immutability, which could be used where users do not have independent information about their document access, involves both document search and document retrieval. For this requirement, the access control information cannot be stored in the application database. Instead, it is stored in the document owner's vault. This scheme is the subject matter of the present invention, and it is illustrated through the flow diagrams of FIGS. 5 and 6, and discussed below.

In the preferred embodiment, each document has, associated with it, an access control list (ACL) which identifies the access authorization to the document for different users. In addition, each user in the system has a capability list which identifies all stored documents which the user does not own, but to which it has access.

Figure 5A:
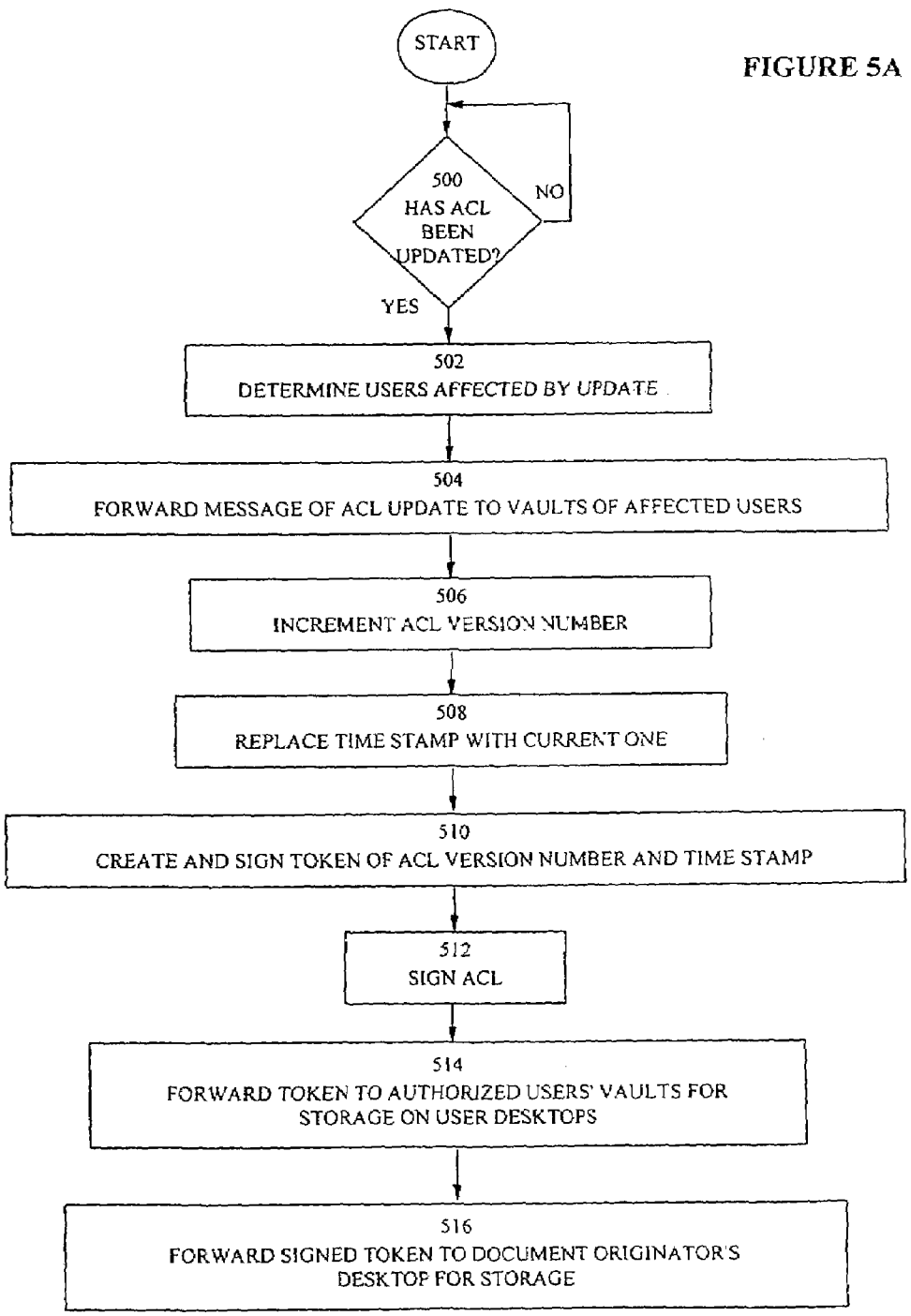
FIGS. 5A and 5B are flow diagrams showing a process, according to the preferred embodiment of the invention, providing immutability of access control for document search and retrieval.
Figure 5B:
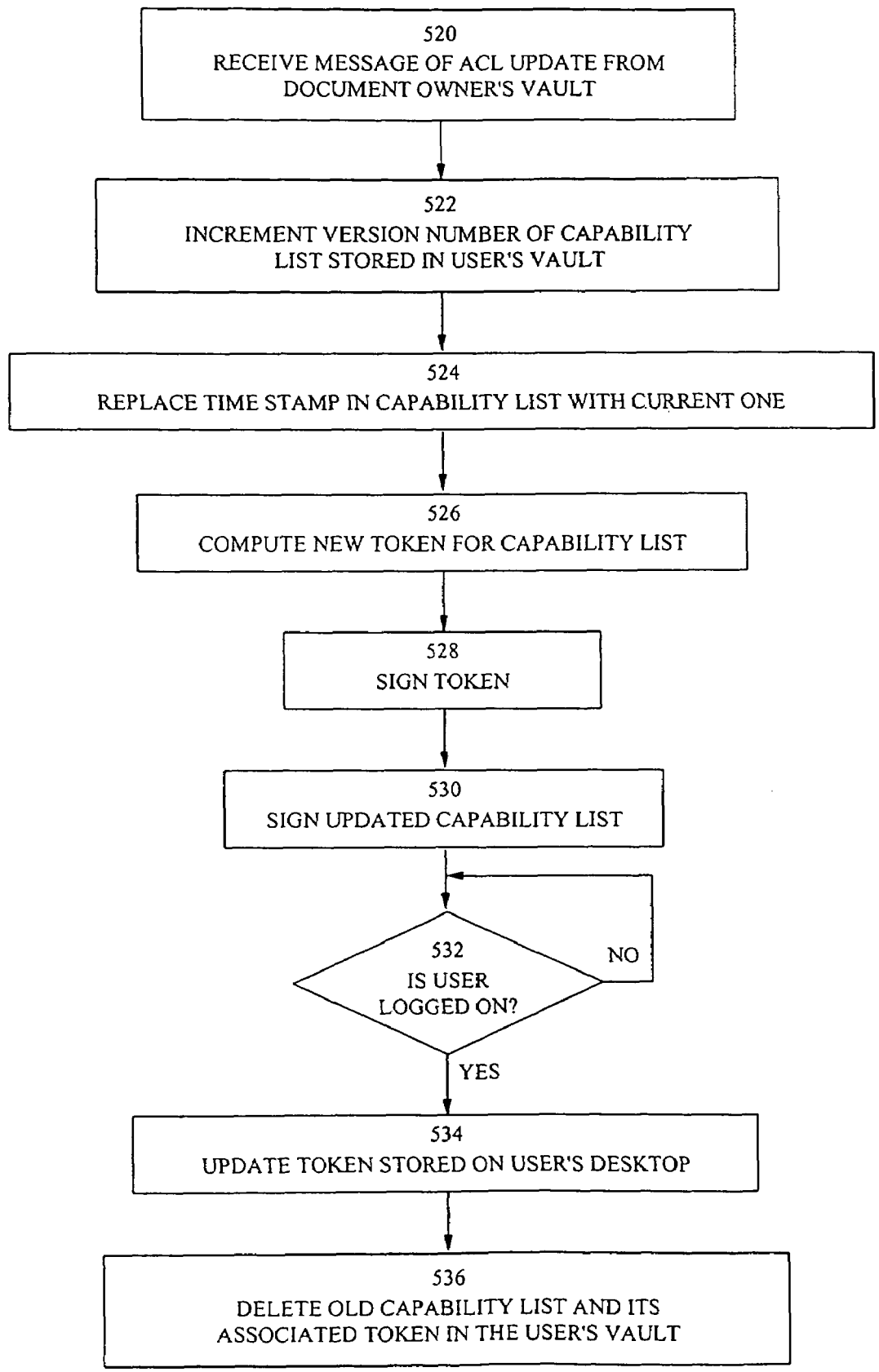

In order to guarantee immutability, each ACL is processed, in the document owner's vault as illustrated in FIG. 5A, and, in parallel, each capability list is processed in the associated user's vault as illustrated in FIG. 5B.

Beginning with FIG. 5A, whenever an ACL has been updated (block 500), the document owner's vault determines which users are affected by the change (block 502), and a message identifying the type of change in access (access added, expanded or restricted) is deposited in the vault of each user whose access to the document has been modified (block 504).

Each ACL is associated with a version number and a time stamp of its latest modification. Thus, the document owner's vault then increments the ACL's version number (block 506) and replaces the old time stamp associated with it, with the most current time stamp (block 508). A token, which is intended to guarantee the immutability of the ACL, is created from the current version number and time stamp now associated with the ACL, and is signed by the document originator's vault (block 510). The ACL is also signed by the document originator's vault (block 512).

The ACL token is then forwarded to the vault of any user with authorized access to the document, for storage with the user's access application on its desktop (block 514) for future ACL verification. The signed token is forwarded to the document originator's desktop for storage (block 516).

Because it is holding a copy of the signed token, the document originator becomes the final arbiter of whether the document ACL is up-to-date or not.

When a business partner wants to retrieve a document, the AS vault application sends the encrypted document to the originator's vault as described above (block 408 of FIG. 4A). In order to verify the requestor's authorization (block 412 of FIG. 4A), the document originator's vault simply checks in the verified ACL, stored locally, that the requester has access to the indicated document. With this technique, nobody can modify the ACL stored in the application database, without that change being detected by the originator's vault.

As described above, each user which owns documents in the repository, keeps on its desktop the signed tokens of the correct version of each ACL. The ACL versions kept by the user's vault are verified by comparing the signed token stored on the user's desktop with the one stored in the user's vault. This comparison can be performed at different times; one good opportunity to verify the ACLs stored inside a user's vault is during logon, so that every time the user logs on, the user's ACLs are verified.

If ACL verification fails, the user's vault application can automatically stop honoring all requests to retrieve the document protected by the ACL. This state of document inaccessibility would persist until the user either creates a new ACL, or re-certifies the existing ACL. The process of re-certification of the existing ACL would include synchronizing the ACL token stored in the user's vault with the token stored on the user's desktop.

Whenever an ACL is updated, a number of steps take place in parallel to those set out in FIG. 5A. These additional steps are illustrated in FIG. 5B.

Each user's vault is responsible for maintaining a capability list, which contains a list of all the documents to which the user has access. The currency of the capability list itself is identified with a version number and last time stamp. This, when a message indicating a modification in a user's capability to access a document (an update to a document ACL) arrives in the user's vault (block 520), the capability list in the user's vault is automatically updated by version number block (block 522) and latest time stamp (block 524). A token is computed over the version number and time stamp (block 526) which can be used to verify the correctness of the capability list. The signed token and capability list are both stored in the user's vault (block 532), but the user's vault preserves the old capability list and its token, as the token for the old capability list corresponds with the token stored on the user's desktop until the update can be.

One way to synchronize the current capability list with the user's token stored on the desktop is to do so automatically when the user logs on (block 532). The correctness of the token in the user's desktop can be checked against the old token preserved in the user's vault, and then the updated token sent to the user's desktop (block 534). Once the old token has been replaced on the user's desktop, the old capability list and its associated token can be deleted from the user's vault.

Another alternative for updating the capability list token on the user's desktop (not shown) is to require the user to take the initiative to review updates to the capability list since its last logon.

To assure the correspondence between ACLs and the capability lists, the environment on which the system is based (e.g., the IBM Vault Registry product) must provide guaranteed message delivery for messages deposited from one vault to another. The guaranteeing of the delivery of a capability update may also be done by the application, by for example requiring a receipt from the user who receives the update.

As a result of this scheme, the ACL and the capability list are all stored by their respective owners. No party in the system can possibly change the access control list of a document, without the document owner becoming aware of the change. Furthermore, no party in the system can change a user's knowledge of access to a document (i.e., a capability) without the authorized user become aware of the change.

In contrast to the access control scheme described in our above-identified copending application in which searches are done by the application server's vault, with the present invention, searches for documents a user is authorized to access are done by the user's own vault application.

Assignment of Ownership Privileges

Some environments require that a document owner be able to allow someone else to modify the access list of the given document. For example, if the owner is not available, another authorized user will have the ability to update the given document's access control.

Figure 6:
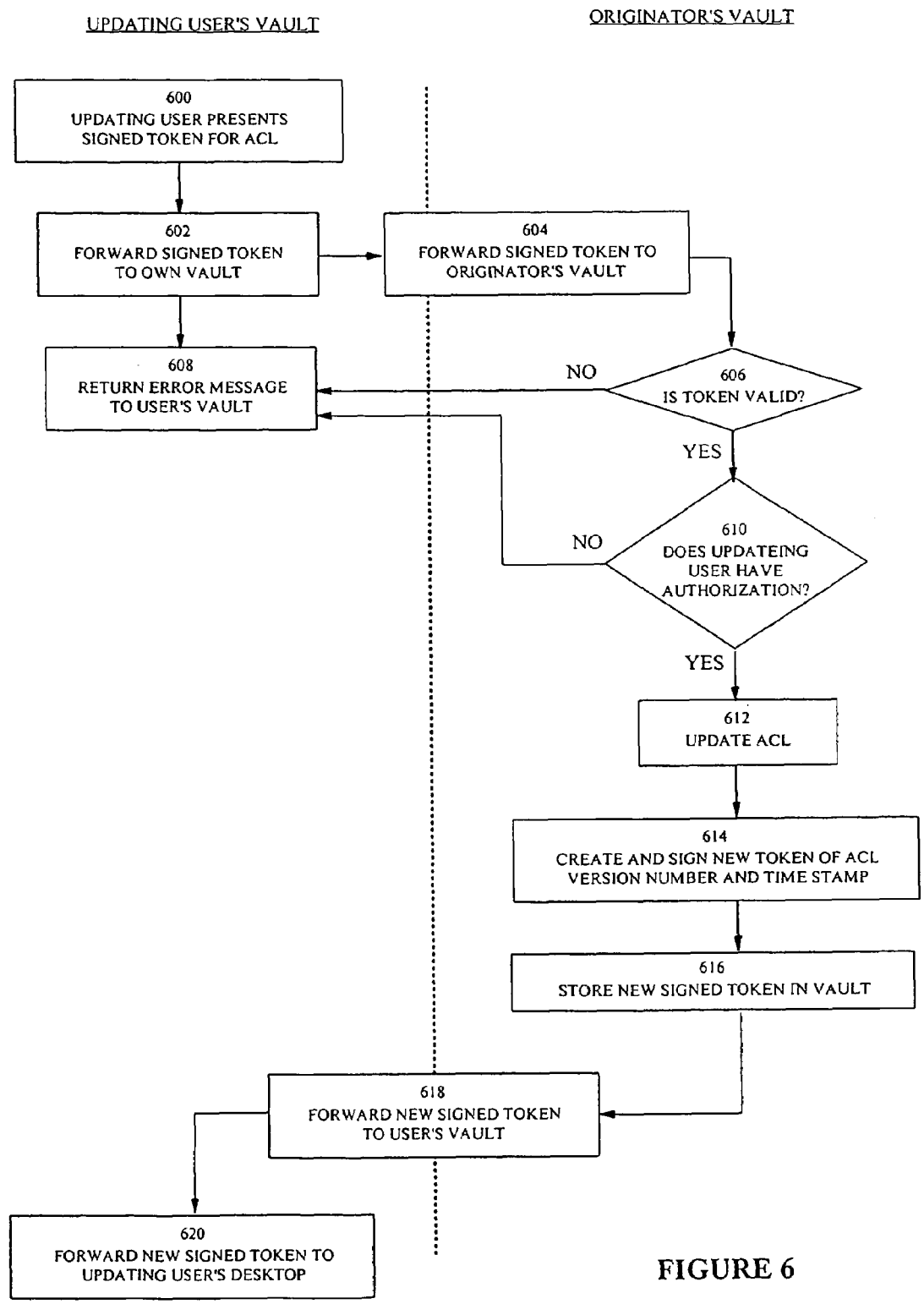
FIG. 6 is a flow diagram illustrating a process for assigning ownership privileges over stored documents, according to the invention.

According to a preferred embodiment of the invention, the updating of ACLs or capability lists can be performed by other users in the system following the steps set out in FIG. 6.

For example, when ACL update is attempted, the updating user must be able to present the up-to-date signed token for the ACL (block 600). The signed token is sent to the user's own vault (block 602) which passes the signed token to the originator's vault (block 604). If the updating user does not have ownership privileges assigned in the ACL of this document, then the document owner's vault will detect this, refuse the update and return an error message to the user's vault (blocks 606, 608).

If the originator's vault can verify the signing user's access to the document, and that the version number, and time stamp of the ACL token are current (block 606), the ACL is updated (block 610) and a new token is generated and signed (block 612), and stored in the originator's vault (block 614). The new signed token is sent to the updater's vault (block 616). The updater's vault returns the new token to the updater's desktop for storage (block 618). The new signed token may also, optionally, be forwarded to the application server's vault for storage in the repository (block 620).

This procedure requires that only one person may perform an ACL update at any given time. For example, if a document owner John will be leaving for vacation, he can permit a co-worker, Mary, to update the ACL of his document in his absence from the office by giving Mary his up-to-date token for the ACL of the document. Mary then issues an ACL update by presenting the token through her vault to John's vault. Mary receives the new signed token for the ACL which she returns to John on his return to the office. After installing the new token, John can issue his own ACL update.

Data Backup and Recovery

Occasionally it may be necessary for the administrator of the document repository to restore the document database from a previous backup. This may be necessary, for example, in case of a catastrophic database failure, such as a disk crash.

The data that needs to be included in a backup are the documents themselves, the ACLs (whether stored in the application database or in the owner's vaults), the capability lists (for the systems the implement them, as described above), and the verification tokens of ACLs and capability lists.

Following a data restoration, updates made after the most recent backup may be lost. For the purposes of the present invention, this could include ACL and capability list updates. When this occurs, the verification tokens stored on user desktops may not correspond with the tokens in the corresponding vaults, denying users proper access.

Therefore, the following system has been implemented to provide a standard for data restoration in different situations. It is assumed that the backup was taken at TIME1, while the restoration occurred at a later TIME2.

Where a complete data restore of the document database, ACLs, capability lists and corresponding tokens stored in the vaults is performed, users authorized to access a document before TIME1, can also access it after TIME2. This means that if a user was authorized before TIME1, but the authority was revoked after TIME1 but before TIME2, the user will have document access until the document owner performs a check of the ACL token. All users should therefore do an ACL and capability list check following a compete data restoration.

Where only the document database was restored, while the ACLs, the capability lists and the vault-stored tokens are untouched, users may find that they are authorized to access a document which does not exist in the database because the document has been added after TIME1, but subsequently lost in the database restore. Since all tokens are up-to-date, no other anomalies will occur.

Another case involves a system in which capability lists are not used, but the ACLs are stored in the application database. Where the document database and the ACL have been restored, while the vault-stored tokens have not, users will find that all documents whose ACL changed after TIME1 are inaccessible. This is because the ACL tokens in the application database do not match the tokens stored in the individual owners' vaults. To deal with this, all document owners will have to update the ACLs. One way to do this is for the administrator to send the old ACLs (which were in effect at TIME1) to document owners, and ask them to re-install the corresponding tokens in their vaults. This update would be manual, not automatic, and an owner's documents are inaccessible until the owner has performed the update.

For situations where database inconsistencies must be avoided, the repository administrator may disable access to all documents after a restore, until the originator takes corrective action. This disabling of access may apply to all documents stored in the repository, or to only a subset of the documents, whose consistency is the most critical. In this case, the repository administrator must be relied upon to preserve consistency of the system. However, as described above, the administrator in any case does not have the power to grant or revoke users' access to a document.

The present invention can be used on any properly configured general purpose computer system, such as the one shown in FIG. 7. Such a computer system 700 includes a processing unit (CPU) 702 connected by a bus 701 to a random access memory 704, a high density storage device 708, a keyboard 706, a display 710 and a mouse 712. In addition, there is a floppy disk drive 714 and a CD-ROM drive 716 for entry of data and software, including software embodying the present invention, into the system on removable storage. An example of such a computer is an IBM Personal Computer of the International Business Machines Corporation, such as an Aptiva personal computer operating on Microsoft Windows 98 operating system of the Microsoft Corporation. Also in this example there is an internet browser capable of running Java such as Netscape Navigator, e.g., Netscape Communications Corporation, Internet Explorer, e.g., Microsoft Corporation.

Preferred embodiments of the invention implemented by means of the IBM Vault Registry product have been described. However, it will be obvious to the person skilled in the art that the present invention could be implemented using other products that provide similar functions, such as secure vault-like environments located locally with each user's desktop. Modifications of this nature and others that would be obvious to the person skilled in the art are intended to be covered by the scope of the appended claims.

The embodiments of the invention in which an exclusive property or privilege is claimed are defined as follows:

1. A computer program product on a computer usable medium for maintaining a secure electronic data search system for a third party electronic data repository in which electronic data file documents are stored in encrypted form in the data repository to prevent access by the repository administrator such a system having a record listing document access privileges for each computer with access to electronic data stored in the repository the program product comprising:
   software for updating a manifest for an electronic data file document stored in the repository;
   software for identifying all computers with access to the electronic data file document and for changing such access in an update software for communicating the change in access to all affected computers;
   software for updating access privileges records in all affected software; and
   software for communicating the access privilege records to the affected computers;
   software in a vault of the document originator to encrypt a document that it receives from the originator, prior to forwarding it onto the electric data vault of the repository;
   software in a vault of the repository administrator which on receipt of the encrypted document, signs the encrypted document itself before storing the document in the electronic data repository and returns to the originator's vault proof of deposition of the encrypted document;
   software in a vault of a requesting user to request the repository's vault for use of the requested document;
   software in the repository's vault to retrieve a copy of the document in encrypted form which is forwarded, along with the requester's identity, to the originator's vault;
   software in the originator's vault to verify that the requester is authorized to view the document from the access control list using an access control list identifying access ownership privileges for the document stored in the vault itself;
   software in the originator's vault when the requester has access to decrypt the document and forward the decrypted document directly to the requester's vault; and
   software in the requester's vault to provide proof of receipt of the decrypted document wherein the originators of the electronic data files, users of the electronic data files and the repository administrator all have vaults which are secure extensions of their respective work space.

2. A process for maintaining a secure electronic data search system for a third party electronic data repository which contains document data files encrypted to make them secure from the administrator of the repository, the system having a manifest listing access controls for each electronic data file stored in the data repository and a record maintained by a documents originator listing document access privileges for each computer with access to the electronic data stored in the repository which record is maintained secure from the administrator of the repository, the process comprising the steps performed by the documents originator of:
   updating a manifest for an electronic data file stored in the repository;
   identifying all computers with a change in access to the electronic data file effected by the update;
   updating the access privileges records of all affected computers;
   communicating the updated access privilege records to the affected computers;
   providing the originators of the electronic data files, users of the electronic data files and the repository with vaults which are secure extensions of their respective work spaces;
   encrypting in the vault of the document originator a document of the originator, prior to forwarding it on to the vault of the repository;
   signing the encrypted document in the vault of the repository before storing the document in the electronic repository and returning to the originator's vault proof of deposition of the encrypted document;
   sending from the vault of a requesting user to the repository's vault a request to use the requested document;
   retrieving from the repository's vault a copy of the document in encrypted form and forwarding it along with the requester's identity, to the originator's vault;
   verifying in the originator's vault that the requester is authorized to view the document from the access control list in the originators vault identifying access privileges for the document;
   decrypting the document in the originator's vault when the requester has access and forwarding the decrypted document directly to the requester's vault; and
   having the requester's vault provide proof of receipt of the decrypted document.

3. A computer program product on a computer usable medium for maintaining a secure electronic data search system for a third party electronic data repository in which electronic data file documents are stored in encrypted form in the data repository to prevent access by the repository administrator such a system having a manifest to an electronic data document secure to the originator of the electronic document listing document access privileges for each computer with access to the electronic data document stored in the repository, the program product comprising:
   software for updating the manifest for the electronic data file document stored in the repository;
   software for identifying all computers with access to the electronic data file document and for changing such access in an update software for communicating the change in access to all affected computers;
   software in the vault of the document originator to encrypt a document that it receives from the originator, prior to forwarding it on to the vault of the repository administrator;
   software in the vault of the repository which on receipt of the encrypted document, signs the encrypted document before storing the document in the electronic repository and returning to the originator's vault proof of deposition of the encrypted document;

software in the vault of a requesting user to the repository's vault to request use of the requested document;

software in repository's vault to retrieve a copy of the document in encrypted form which is forwarded, along with the requester's identity, to the originator's vault;

software in the originator's vault to verify that the requester is authorized to view the document using an access control list identifying access ownership privileges for the document stored in the vault itself;

software in the originator's vault when the requester has access decrypts the document and forwards the decrypted document directly to the requester's vault; and software in the requester's vault to provide proof of receipt of the decrypted document.

* * * * *